ð US010309260B2

United States Patent
Ramadhan et al.

(10) Patent No.: US 10,309,260 B2
(45) Date of Patent: Jun. 4, 2019

(54) STEAM TURBINE STARTUP SUPPORT SYSTEM

(71) Applicant: KABUSHIKI KAISHA TOSHIBA, Minato-ku (JP)

(72) Inventors: Reza Akhyar Ramadhan, Kawasaki (JP); Koichi Kitaguchi, Yokohama (JP); Taihei Kuroda, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 207 days.

(21) Appl. No.: 15/438,312

(22) Filed: Feb. 21, 2017

(65) Prior Publication Data

US 2017/0248038 A1 Aug. 31, 2017

(30) Foreign Application Priority Data

Feb. 25, 2016 (JP) .................................. 2016-034195

(51) Int. Cl.
  *F01K 13/02* (2006.01)
  *G05B 19/048* (2006.01)
  *G05B 23/02* (2006.01)

(52) U.S. Cl.
  CPC ............ *F01K 13/02* (2013.01); *G05B 19/048* (2013.01); *G05B 23/0294* (2013.01); *G05B 2219/50185* (2013.01)

(58) Field of Classification Search
  None
  See application file for complete search history.

(56) References Cited

U.S. PATENT DOCUMENTS

| 8,240,148 B2 | 8/2012 | Matsumoto et al. |
| 2006/0233637 A1* | 10/2006 | Yakushi ................. F01D 17/00 415/13 |
| 2009/0288416 A1* | 11/2009 | Matsumoto ............ F01D 19/02 60/646 |
| 2016/0195026 A1* | 7/2016 | Sopcic .................... F02C 9/28 701/100 |

FOREIGN PATENT DOCUMENTS

JP  2009-281248  12/2009

* cited by examiner

*Primary Examiner* — Kenneth M Lo
*Assistant Examiner* — Istiaque Ahmed
(74) *Attorney, Agent, or Firm* — Oblon, McClelland, Maier & Neustadt, L.L.P.

(57) ABSTRACT

There is provided a steam turbine startup support system capable of easily selecting a proper startup transition pattern from various startup transition patterns. In a steam turbine startup support system of the embodiment, an economic efficiency evaluation device performs economic efficiency evaluation regarding the various startup transition patterns recorded in a startup transition pattern recording device based on parameters recorded in a parameter recording device and information relating to a rotor lifetime recorded in a rotor lifetime recording device. Besides, a screen display device displays a result of the economic efficiency evaluation performed by the economic efficiency evaluation device.

7 Claims, 5 Drawing Sheets

| STARTUP MODE | | COLD | | | |
|---|---|---|---|---|---|
| STARTUP TRANSITION PATTERN | NORMAL | OPTIMUM 1 | OPTIMUM 2 | RAPID 1 | RAPID 2 |
| NUMBER OF STARTUP TIMES FOR ONE YEAR (TIMES) | 40 | 40 | 40 | 40 | 40 |
| NUMBER OF YEARS OF ROTOR LIFETIME (YEARS) | 30 | 29 | 28 | 25 | 22 |
| STARTUP TIME $t_s$ (min) | 145 | 112 | 85 | 69 | 45 |
| ROTOR LIFETIME CONSUMPTION AMOUNT PER ONE TIME STARTUP LCFI (%) | 0.0036 | 0.0212 | 0.0325 | 0.0601 | 0.092 |
| NUMBER OF YEARS OF ROTOR LIFETIME REDUCTION $L_{RD}$ (YEARS) | 0 | 1 | 2 | 5 | 8 |
| TOTAL NUMBER OF STARTUP TIMES $N_C$ (TIMES) | 1200 | 1160 | 1120 | 1000 | 880 |

FIG.3B
Related Art

STEAM TURBINE STARTUP SUPPORT SYSTEM

CROSS-REFERENCE TO RELATED APPLICATION

This application is based upon and claims the benefit of priority from Japanese Patent Application No. 2016-034195 filed on Feb. 25, 2016; the entire contents of which are incorporated herein by reference.

FIELD

Embodiments described herein relate to a steam turbine startup support system.

BACKGROUND

It is demanded for a steam turbine power generation plant to shorten a startup time to start up a steam turbine so as to reduce a consumption amount of fuel consumed when the steam turbine is started up and to suppress opportunity loss of selling electricity. However, a thermal stress generated at a turbine rotor becomes large and an expansion difference between the turbine rotor and a casing becomes large due to thermal expansion in accordance with the shortening of the startup time. The startup of the steam turbine is therefore controlled such that the thermal stress of the turbine rotor and the expansion difference between the casing and the turbine rotor become prescribed values or less when the steam turbine is started up.

Figure 3A:
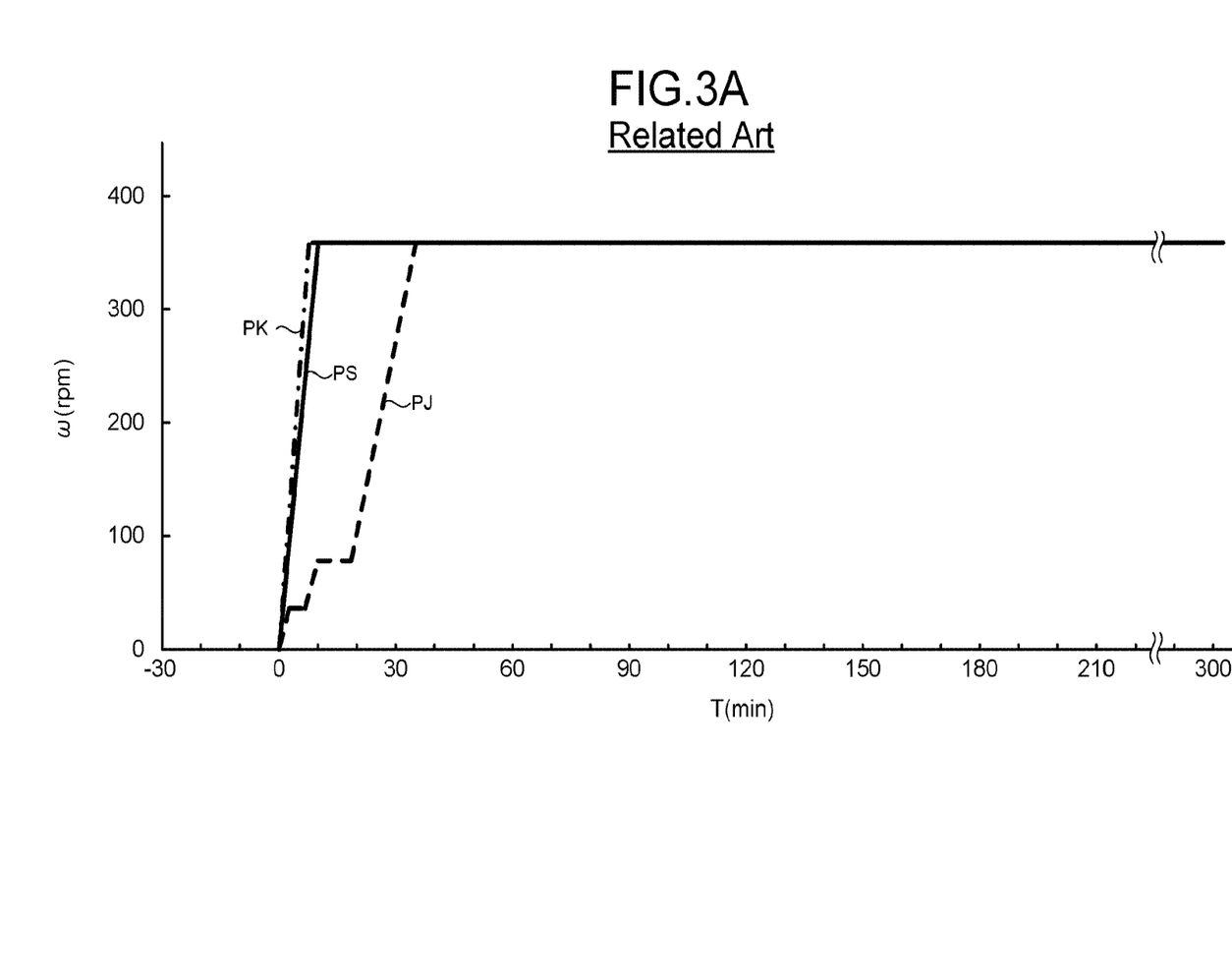
FIG. 3A illustrates startup transition patterns showing how rotation speed ω (rpm) of a turbine rotor changes when a steam turbine is started up at a steam turbine power generation plant according to a related art.

FIG. 3A illustrates startup transition patterns where a rotation speed co (rpm) of the turbine rotor changes when the steam turbine is started up at the steam turbine power generation plant according to a related art. Besides, FIG. 3B illustrates startup transition patterns where a load L (%) (power output) changes when the steam turbine is started up at the steam turbine power generation plant according to the related art.

Figure 3B:
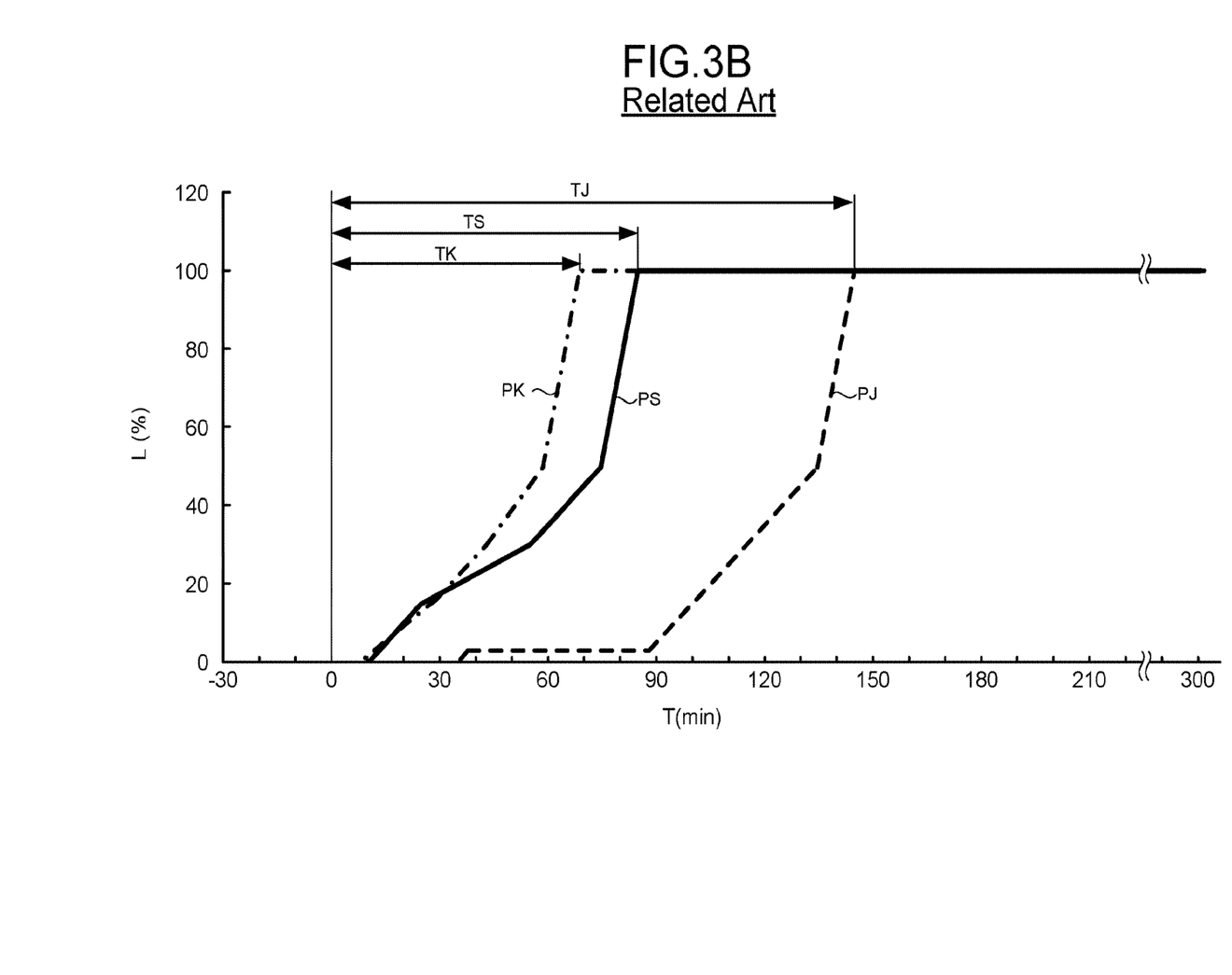
FIG. 3B illustrates startup transition patterns showing how load L (%) (power output) changes when the steam turbine is started up at the steam turbine power generation plant according to the related art.

In FIG. 3A and FIG. 3B, a normal startup transition pattern PJ (dotted line), an optimum startup transition pattern PS (solid line), and a rapid startup transition pattern PK (dot and dash line) are exemplified as the startup transition patterns. In FIG. 3B, there are illustrated startup times TJ, TS, TK (a time from a point (t="0" (zero)) when the rotation speed ω begins to increase to a point when the load L increases to a rated load (100%)) relating to the respective startup transition patterns PJ, PS, PK. As illustrated in FIG. 3B, the startup time TS of the optimum startup transition pattern PS is shorter than the startup time TJ of the normal startup transition pattern PJ, and the startup time TK of the rapid startup transition pattern PK is shorter than the startup time TS of the optimum startup transition pattern PS.

When the startup is performed according to the optimum startup transition pattern PS, an operation amount of a control valve is set such that the thermal stress and the expansion difference generated in a predetermined startup time become the prescribed values or less. When the startup is performed according to the rapid startup transition pattern PK, the operation amount of the control valve is set such that the thermal stress becomes a value or less which is found in accordance with a lifetime consumption amount of a turbine rotor.

When the steam turbine is started up, it is necessary to select a proper startup transition pattern from among various startup transition patterns in consideration of parameters relating to economic efficiency such as the lifetime consumption amount of the turbine rotor in addition to a fuel cost or the like.

Specifically, it is appropriate to select the rapid startup transition pattern PK whose startup time is the shortest to suppress the fuel cost when the fuel cost is extremely high. It is appropriate to select the normal startup transition pattern PJ whose lifetime consumption amount of the turbine rotor is the smallest when it is necessary to suppress the lifetime consumption amount of the turbine rotor after several years have past since its first commercial operation. It is appropriate to select the optimum startup transition pattern PS when the fuel cost is within reasonable rang and there is no need to give priority consideration to the lifetime consumption amount of the turbine rotor.

However, it has been conventionally difficult for a user to easily grasp merits and demerits of the economic efficiency relating to the various transition patterns. It is therefore not easy that the user selects the appropriate startup transition pattern from various startup transition patterns.

Accordingly, a problem to be solved by the present invention is to provide a steam turbine startup support system which is capable to easily select most appropriate startup transition pattern from various/multiple startup transition patterns.

DETAILED DESCRIPTION

A steam turbine startup support system of an embodiment supports a startup performed according to a startup transition pattern in a steam turbine where a power generator is driven by a turbine rotor rotated by steam. The steam turbine startup support system includes a startup transition pattern recording device, a parameter input device, a parameter recording device, a rotor lifetime recording device, an economic efficiency evaluation device, and a screen display device. The startup transition pattern recording device records various startup transition patterns. In the parameter input device, there are input for unit fuel cost which is cost of consumed to generate steam, an electricity selling price of electric power which is generated by driving of a power generator and sold, a rotor price of the turbine rotor, a fuel consumption rate of fuel, an availability of the steam turbine, a rotor lifetime limit value of the turbine rotor, and an output target value of the electric power output by the driving of the power generator as parameters. The parameter recording device records the parameters inputted by using parameter input device. The rotor lifetime recording device records information relating to the rotor lifetime of the turbine rotor. The economic efficiency evaluation device performs evaluation of the economic efficiency regarding various startup transition patterns recorded in the startup transition pattern recording device based on the parameters recorded in the parameter recording device and the information relating to the rotor lifetime recorded in the rotor lifetime recording device. The screen display device displays a result of the economic efficiency evaluation performed by the economic efficiency evaluation device.

Figure 1A:
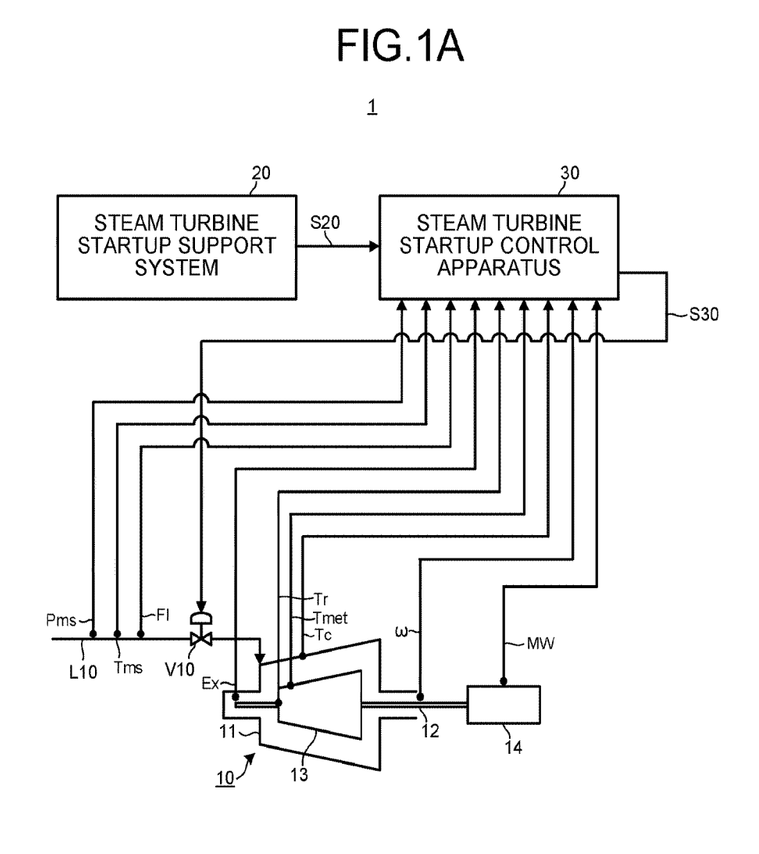
FIG. 1A is a view schematically illustrating a substantial part of a steam turbine power generation plant according to an embodiment.

FIG. 1A is a view schematically illustrating a substantial part of a steam turbine power generation plant according to the embodiment.

A steam turbine power generation plant 1 includes a steam turbine 10, a steam turbine startup support system 20, and a steam turbine startup control apparatus 30 as illustrated in FIG. 1A.

The steam turbine 10 includes a casing 11 and a turbine rotor 12. In the steam turbine 10, the turbine rotor 12 is accommodated in the casing 11, and the turbine rotor 12 is supported by a bearing (not-illustrated). In the casing 11, steam path part 13 is located inside, and several turbine stages (not-illustrated) are arranged in an axial direction along a rotation shaft of the turbine rotor 12 at the steam path part 13. Each turbine stages consists of a set of static blade and a set of rotating blade. Static blade is located at inner peripheral surface of casing 11 and arranged in rotational direction, and rotating blade is located at outer peripheral surface of turbine rotor 12 and arranged in rotational direction.

At the steam turbine 10, steam generated at a boiler (not-illustrated, including a heat recovery steam generator) is supplied to an inside of the casing 11 through a main steam pipe L10 as a working fluid. A control valve V10 (steam control valve) is located at the main steam pipe L10, and a flow rate of the steam flowing in the main steam pipe L10 is adjusted by controlling position of the control valve V10. The position of the control valve V10 is controlled in accordance with a command S30 which is output from the steam turbine startup control apparatus 30.

At the steam turbine 10, the steam supplied to the inside of the casing 11 as the working fluid sequentially performs work at each of turbine stages. The turbine rotor 12 is thereby rotated, and thereby, a power generator 14 is driven to generate power. The steam flows from the turbine stage at a first stage to the turbine stage at a final stage, and thereafter, is exhausted from an exhaust hood (not-illustrated) of the casing 11 to a steam condenser (not-illustrated).

The steam turbine startup support system 20 outputs information S20 relating to startup transition patterns to the steam turbine startup control apparatus 30 as an output signal to support startup which is performed at the steam turbine 10 according to the startup transition patterns. A detailed configuration of the steam turbine startup support system 20 is described as follows.

When the steam turbine startup control apparatus 30 controls the startup of the steam turbine 10, operating data which are detected by detectors at each part of the steam turbine 10 are inputted to the steam turbine startup control apparatus 30 in addition to the information S20 relating to the startup transition patterns inputted from the steam turbine startup support system 20. Here, there are input a main steam pressure Pms, a main steam temperature Tms, a main steam flow rate F1 are detected regarding the steam (main steam) flowing in the main steam pipe L10, and these operating data is inputted to the steam turbine startup control apparatus 30. Besides, a casing temperature Tc which is detected regarding a temperature of the casing 11, a first stage metal temperature Tmet which is detected regarding a temperature at a metal part of the turbine stage at the first stage, a turbine rotor temperature Tr which is detected regarding a temperature of the turbine rotor 12, and a turbine rotation speed ω which is detected regarding a rotation speed of the turbine rotor 12 are inputted to the steam turbine startup control apparatus 30 as operating data. In addition, expansion difference Ex between the casing 11 and the turbine rotor 12 and a load MW (power output) of the power generator 14 are inputted to the steam turbine startup control apparatus 30.

The steam turbine startup control apparatus 30 outputs the command S30 relating to an operation amount of the control valve V10 to the control valve V10 as an output signal based on the information S20 relating to the startup transition patterns and each operating data. The operation amount of the control valve V10 is thereby controlled such that the startup of the steam turbine 10 is performed according to the startup transition pattern input from the steam turbine startup support system 20. As a result, a thermal stress of the turbine rotor 12 and the expansion difference between the casing 11 and the turbine rotor 12 become prescribed values or less when the steam turbine 10 is started up.

Note that the steam turbine startup control apparatus 30 includes an arithmetic unit (not-illustrated) and a memory (not-illustrated), and is constituted such that the arithmetic unit performs arithmetic processing by using programs stored in the memory to output a result of the arithmetic processing.

Figure 1B:
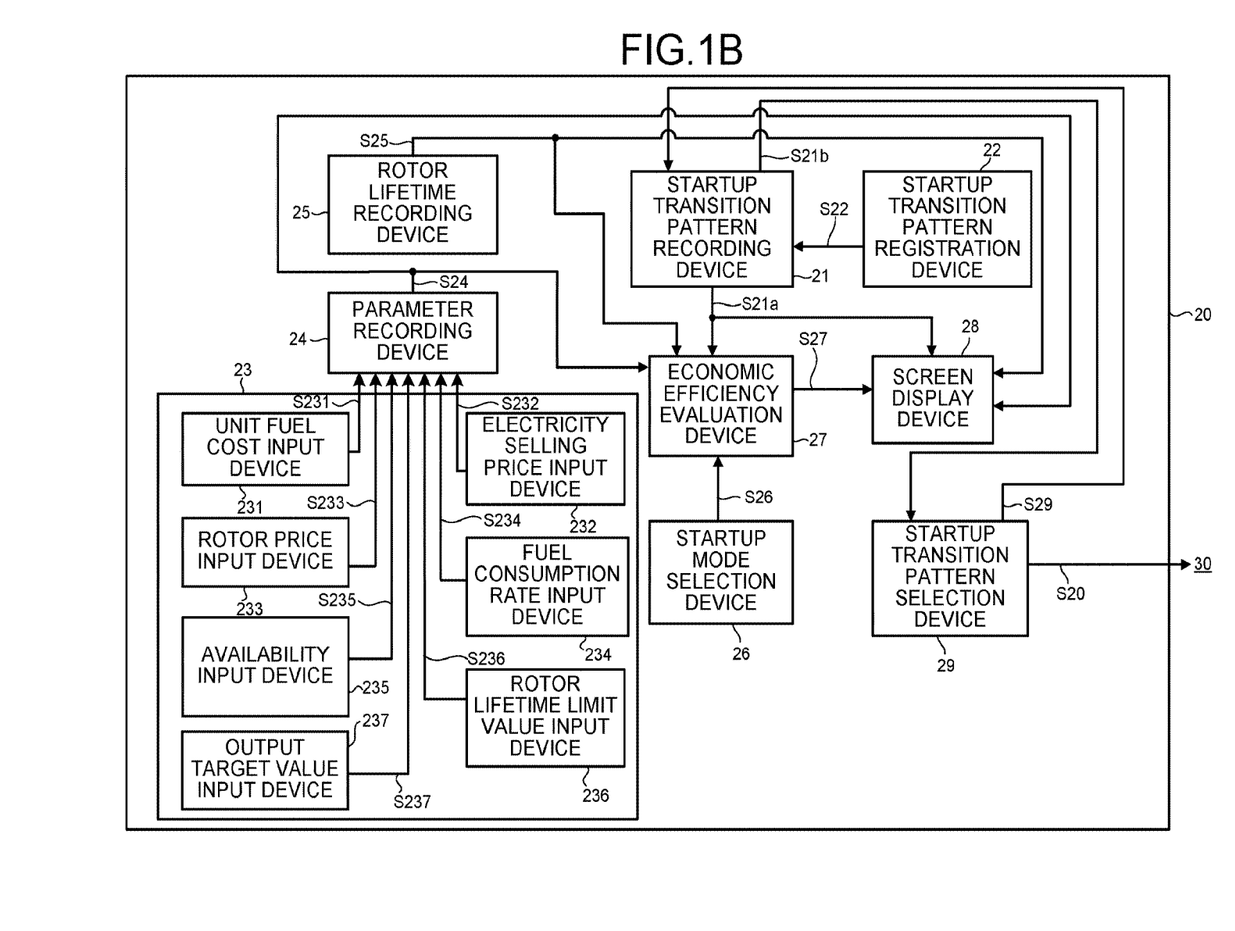
FIG. 1B is a block diagram illustrating a detail of a steam turbine startup support system in the steam turbine power generation plant according to the embodiment.

FIG. 1B is a block diagram illustrating a detail of the steam turbine startup support system in the steam turbine power generation plant according to the embodiment.

A startup transition pattern recording device 21 includes recording devices such as a memory, and is constituted to record information relating to various startup transition patterns. The startup transition pattern recording device 21 records the information relating to various startup transition patterns by classifying into several startup modes. For example, there are set three startup modes of a hot startup mode, a warm startup mode, and a cold startup mode in accordance with an elapsed time elapsed from a point when an operation of the steam turbine 10 is stopped, and the startup transition pattern recording device 21 records the information relating to various startup transition patterns while classifying into the three startup modes.

Figure 2:
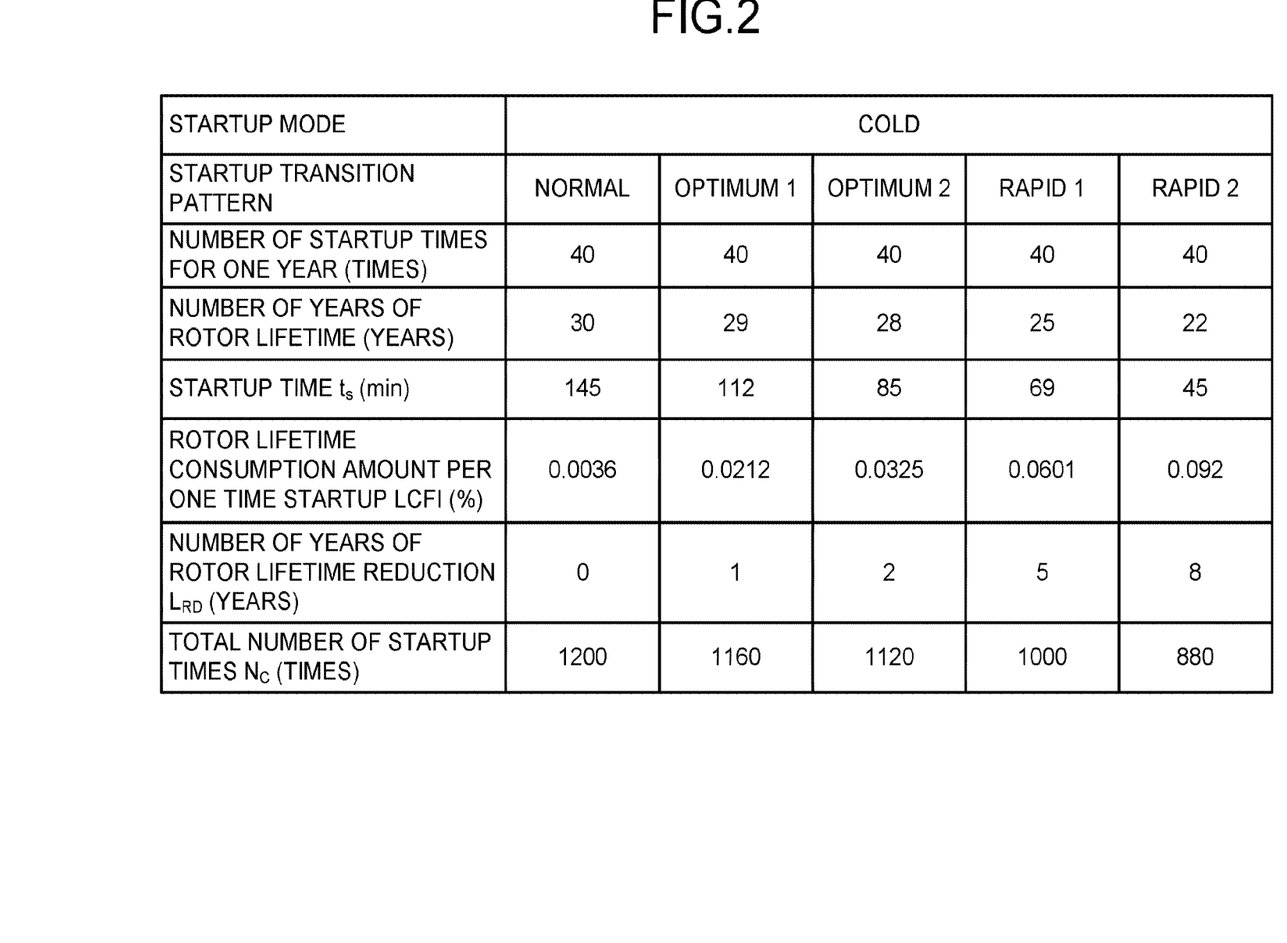
FIG. 2 is a view illustrating an example of various startup transition patterns which are recorded in a startup transition pattern recording device in the steam turbine startup support system according to the embodiment by means of a table.

FIG. 2 is a view illustrating an example of various startup transition patterns which are recorded in the startup transition pattern recording device in the steam turbine startup support system according to the embodiment by means of a table.

As illustrated in FIG. 2, the startup transition pattern recording device 21 records, for example, a normal startup transition pattern (denoted as "normal"), a first optimum startup transition pattern ("optimum 1"), a second optimum startup transition pattern ("optimum 2"), a first rapid startup transition pattern ("rapid 1"), and a second rapid startup transition pattern ("rapid 2") as the startup transition patterns when the startup mode is the cold startup mode. Each startup transition pattern is recorded with several information (a speed-up rate of a rotation speed, an increase rate of a load, a heat soak time, and so on) relating to the change of the rotation speed of the turbine rotor 12 (refer to FIG. 3A) and the change of the load (power output) (refer to FIG. 3B). In addition, each startup transition pattern is recorded respectively with several parameters such as number of startup times for one year, a startup time, an LCFI (a rate of a rotor lifetime consumed for one time startup), the number of years of rotor lifetime, the number of years of rotor lifetime reduction, and the total number of startup times (the number of times of all possible startups before the end of the rotor lifetime) are associated as illustrated in FIG. 2. In the normal startup transition pattern, the first optimum startup transition pattern, the second optimum startup transition pattern, the first rapid startup transition pattern, and the second rapid startup transition pattern, the startup time becomes shorter in this order, and the LCFI becomes larger in this order in accordance with the shortening of the startup time.

When economic efficiency evaluation is performed by an economic efficiency evaluation device 27, the startup transition pattern recording device 21 outputs information S21a relating to the recorded various startup transition patterns to the economic efficiency evaluation device 27 as an output signal. Besides, the startup transition pattern recording device 21 outputs the information S21a relating to the various startup transition patterns to a screen display device 28 as an output signal.

In addition, when information S29 regarding the startup transition pattern selected by a startup transition pattern selection device 29 is inputted from the startup transition pattern selection device 29, the startup transition pattern recording device 21 outputs information S21b relating to the selected startup transition pattern to the startup transition pattern selection device 29.

A startup transition pattern registration device 22 includes user interfaces such as a keyboard, and is constituted such that a user is able to input information relating to the startup transition pattern. When the information relating to the startup transition pattern is inputted, the startup transition pattern registration device 22 outputs the input information S22 to the startup transition pattern recording device 21 as an output signal.

For example, the user inputs information relating to a new startup transition pattern which is not recorded in the startup transition pattern recording device 21 to the startup transition pattern registration device 22. In this case, the startup transition pattern registration device 22 outputs information S22 relating to the input new startup transition pattern to the startup transition pattern recording device 21. The information S22 relating to the new startup transition pattern is thereby recorded in the startup transition pattern recording device 21.

Besides, the user inputs information to change the information relating to the startup transition pattern which is already recorded in the startup transition pattern recording device 21 to the startup transition pattern registration device 22. In this case, the startup transition pattern registration device 22 outputs the input information S22 to the startup transition pattern recording device 21. The information relating to the existing startup transition pattern is thereby changed and recorded in the startup transition pattern recording device 21.

In a parameter input device 23, information relating to a unit fuel cost of fuel consumed to generate steam at a boiler is input to a unit fuel cost input device 231. The unit fuel cost input device 231 outputs information S231 relating to the input unit fuel cost to a parameter recording device 24 as an output signal.

Here, the unit fuel cost input device 231 is constituted such that the user inputs the information relating to the unit fuel cost to user interfaces such as a keyboard, and for example, the unit fuel cost when the fuel is purchased is inputted by the user. In addition, the unit fuel cost input device 231 may be constituted such that it gets access to a web site containing information relating to the unit fuel cost through a network such as internet to automatically obtain real time information relating to the unit fuel cost from the web site.

In the parameter input device 23, information relating to an electricity selling price (unit electricity selling price) of the electric power which is generated by driving of the power generator 14 and sold outside is input to an electricity selling price input device 232. The electricity selling price input device 232 outputs information S232 relating to the input electricity selling price to the parameter recording device 24 as an output signal.

Here, the electricity selling price input device 232 is constituted such that the user inputs the information relating to the electricity selling price to user interfaces such as a keyboard. In addition, the electricity selling price input device 232 may be constituted so as to automatically obtain the information through the network such as internet.

In the parameter input device 23, information relating to a rotor price of the turbine rotor 12 provided at the steam turbine 10 is input to a rotor price input device 233. The rotor price input device 233 outputs information S233 relating to the input rotor price to the parameter recording device 24 as an output signal.

Here, the rotor price input device 233 is constituted such that the user inputs the information relating to the rotor price to user interfaces such as a keyboard. Specifically, new turbine rotor 12 price can be used as input. In addition, a value where a predetermined coefficient is integrated into the new turbine rotor 12 price can be inputted as consideration of a currency expansion (inflation).

In the parameter input device 23, information relating to a fuel consumption rate of the fuel consumed at the boiler is input to a fuel consumption rate input device 234. The fuel consumption rate input device 234 outputs information S234 relating to the input fuel consumption rate to the parameter recording device 24 as an output signal.

Here, the fuel consumption rate input device 234 is constituted such that the user inputs the information relating to the fuel consumption rate to user interfaces such as a keyboard. Specifically, a design value of the fuel consumption rate can be used as input at an initial stage when the number of operation hour of the steam turbine 10 is a less than predetermined value. On the other hand, for example, a value of the fuel consumption rate measured at previous startup can be used as input at period when number of operation hour of the steam turbine 10 is larger than predetermined value.

In the parameter input device 23, information relating to an availability of the steam turbine 10 is input to an availability input device 235. The availability input device 235 outputs information S235 relating to the input availability to the parameter recording device 24 as an output signal.

Here, the availability input device 235 is constituted such that the user inputs the information relating to the availability to user interfaces such as a keyboard.

In the parameter input device 23, information relating to a rotor lifetime limit value of the turbine rotor 12 provided at the steam turbine 10 is input to a rotor lifetime limit value input device 236. The rotor lifetime limit value input device 236 outputs information S236 relating to the input rotor lifetime limit value to the parameter recording device 24 as an output signal.

Here, the rotor lifetime limit value input device 236 is constituted such that the user inputs the information relating to the rotor lifetime limit value to user interfaces such as a keyboard.

In the parameter input device 23, information relating to an output target value of the electric power output by the driving of the power generator 14 is input to an output target value input device 237. The output target value input device 237 outputs information S237 relating to the input output target value to the parameter recording device 24 as an output signal.

Here, the output target value input device 237 is constituted such that the user inputs the information relating to the output target value to user interfaces such as a keyboard, and the target value of the electric power output by the power generator 14 after the startup of the steam turbine 10 is completed is inputted by the user.

The parameter recording device 24 includes recording devices such as a memory, and is constituted such that the information S231 to S237 relating to the respective parameters are input from the respective parts of the parameter input device 23, and the information S231 to S237 are recorded thereto.

Besides, the parameter recording device 24 outputs information S24 relating to the recorded each parameter to the economic efficiency evaluation device 27 as an output signal when the economic efficiency evaluation device 27 performs the economic efficiency evaluation. Besides, the parameter recording device 24 outputs the information S24 to the screen display device 28.

A rotor lifetime recording device 25 includes recording devices such as a memory, and is constituted such that information relating to the rotor lifetime of the turbine rotor 12 is inputted, and the information is recorded thereto. Here, a rotor lifetime consumption amount where the lifetime of the turbine rotor 12 is consumed due to the startup of the steam turbine 10 is input to the rotor lifetime recording device 25, and the rotor lifetime consumption amount is recorded.

The rotor lifetime recording device 25 outputs information S25 relating to the recorded rotor lifetime to the economic efficiency evaluation device 27 as an output signal when the economic efficiency evaluation device 27 performs the economic efficiency evaluation.

Besides, the rotor lifetime recording device 25 outputs a cumulative value where the rotor lifetime consumption amounts are accumulated due to the startup of the steam turbine 10 to the screen display device 28 as the information S25 relating to the rotor lifetime.

In addition, the rotor lifetime recording device 25 includes an arithmetic unit (comparator), and may be constituted to judge whether or not the rotor lifetime exceeds the rotor lifetime limit value when the startups of the steam turbine 10 are performed according to various startup transition patterns based on the cumulative value of the rotor lifetime consumption amounts recorded as the information relating to the rotor lifetime and the rotor lifetime limit value input to the rotor lifetime limit value input device 236. In this case, when it is judged that there is the startup transition pattern where the rotor lifetime exceeds the rotor lifetime limit value, the rotor lifetime recording device 25 outputs that the rotor lifetime exceeds the rotor lifetime limit value as for the startup transition pattern to the screen display device 28.

A startup mode selection device 26 includes user interfaces such as a keyboard, and is constituted such that the user is able to select the startup mode. As stated above, there are set the several startup modes (for example, the hot startup mode, the warm startup mode, the cold startup mode) in accordance with the elapsed time elapsed from the point when the operation of the steam turbine 10 is stopped, and the startup mode selection device 26 selects one startup mode from the several startup modes based on a command of the user.

For example, the cold startup mode is selected under a cold state where the elapsed time is longer than a predetermined value and the temperature of the steam turbine 10 is low. The warm startup mode is selected under a warm state where the elapsed time is shorter than the case of the cold startup mode and the temperature of the steam turbine 10 is higher than the cold startup mode. The hot startup mode is selected under a hot state where the elapsed time is shorter than the case of the warm startup mode and the temperature of the steam turbine 10 is higher than the warm startup mode. The startup mode selection device 26 outputs information S26 relating to the startup mode selected as stated above to the economic efficiency evaluation device 27 when the economic efficiency evaluation device 27 performs the economic efficiency evaluation.

Note that it is described above regarding a case when the selection of the startup mode is performed in accordance with a manual operation of the user, but the embodiment is not limited thereto. The startup mode selection device 26 may be constituted to automatically select the startup mode based on information (not-illustrated) relating to the time elapsed from the point when the operation of the steam turbine 10 is stopped.

The economic efficiency evaluation device 27 includes an arithmetic unit, and performs the economic efficiency evaluation regarding the various startup transition patterns recorded in the startup transition pattern recording device 21 based on the parameters recorded in the parameter recording device 24 and the information relating to the rotor lifetime recorded in the rotor lifetime recording device 25.

Specifically, the information S21a relating to the various startup transition patterns is input from the startup transition pattern recording device 21 to the economic efficiency evaluation device 27. The information S21a contains a startup time $t_s$, the rotor lifetime consumption amount LCFI per one time startup, a rotor lifetime reduction amount $L_{RD}$ due to a startup time shortening relative to a service life of a plant which is designated at a design time, and the total number of startup times $N_C$. Besides, the information S24 relating to each parameter is input from the parameter recording device 24. The information S24 contains a unit fuel cost $S_f$ (=S231), an electricity selling price $S_c$ (=S232), a rotor price $S_R$ (=S233), a fuel consumption rate $m_f$ (=S234), a plant availability A (=S235), and an output target value P (=S237). In addition, the information S25 relating to the rotor lifetime is input from the rotor lifetime recording device 25 and the information S26 relating to the startup mode selected by the startup mode selection device 26 are input to the economic efficiency evaluation device 27.

The economic efficiency evaluation device 27 extracts the startup transition pattern in accordance with the startup mode selected by the startup mode selection device 26 from the various startup transition patterns recorded in the startup transition pattern recording device 21. Besides, the economic efficiency evaluation device 27 further extracts the startup transition pattern which is judged that the cumulative value of the rotor lifetime consumption amounts after the startup of the steam turbine 10 does not exceed the rotor lifetime limit value from the startup transition pattern extracted as stated above.

The economic efficiency evaluation device 27 performs the economic efficiency evaluation regarding the extracted startup transition pattern. Namely, in the embodiment, the economic efficiency evaluation device 27 performs the economic efficiency evaluation regarding the startup transition pattern where the rotor lifetime is smaller than the rotor lifetime limit value when the startup of the steam turbine 10 is performed from the various startup transition patterns.

In the economic efficiency evaluation, a startup time economic parameter is calculated by using the information S21a relating to the startup transition pattern, the information S24 relating to each parameter, and the information S25 relating to the rotor lifetime. The economic efficiency evaluation device 27 outputs information S27 relating to results of the economic efficiency evaluation to the screen display device 28 as an output signal.

In the economic efficiency evaluation, a startup time economic parameter C is calculated based on a fuel consumption parameter $C_F$, a startup time electricity selling opportunity loss parameter $C_U$, a rotor lifetime consumption parameter $C_R$, and an economic effect parameter R due to the startup time shortening as illustrated in the following expression (A).

$$C=C_F+C_U+C_R-R \quad (A)$$

The fuel consumption parameter $C_F$ is calculated based on the startup time $t_s$, the fuel consumption rate $m_f$, and the unit fuel cost $S_f$ as illustrated in the following expression (B).

$$C_F=t_s \times m_f \times S_f \quad (B)$$

The startup time electricity selling opportunity loss parameter $C_U$ is calculated based on the startup time $t_s$, the electricity selling price $S_e$, and the output target value P as illustrated in the following expression (C).

$$C_U=t_s \times S_e \times P \quad (C)$$

The rotor lifetime consumption parameter $C_R$ is calculated based on the rotor lifetime consumption amount LCFI per one time startup, the rotor price $S_R$, the rotor lifetime reduction amount $L_{RD}$ due to the startup time shortening relative to the service life of the plant which is designated at the design time, a plant operation rate A, the output target value P, the electricity selling price $S_e$, and the total number of startup times $N_C$ as illustrated in the following expression (D).

$$C_R=(LCFI \times S_R)+(L_{RD} \times A \times P \times S_e)/N_C \quad (D)$$

The economic effect parameter R due to the startup time shortening is calculated based on a time $\Delta t_{RD}$ where the startup time is shortened relative to the normal startup transition pattern, the electricity selling price $S_e$, and the output target value P as illustrated in the following expression (E).

$$R=\Delta t_{RD} \times S_e \times P \quad (E)$$

Note that when not a full-load operation but a partial load operation is performed after the startup of the steam turbine 10, a value which is converted from a value in case of the full-load operation based on a load increase rate which is recorded in relation to the startup transition pattern is used as the startup time.

The screen display device 28 includes a display, and images representing the respective information S21a, S24, S25, S27 input from the respective parts are displayed on the screen of the display.

Specifically, the screen display device 28 displays, for example, a table illustrated in FIG. 2 on the screen as the image representing the information S21a relating to the various startup transition patterns. Similarly, the screen display device 28 displays, for example, a table (not-illustrated) of each parameter on the screen as the image representing the information S24 relating to each parameter.

Besides, the screen display device 28 displays, for example, the cumulative value of the rotor lifetime consumption amounts on the screen as the image representing the information S25 relating to the rotor lifetime. When the rotor lifetime recording device 25 judges that the cumulative value of the rotor lifetime consumption amounts exceeds the rotor lifetime limit value, the screen display device 28 displays that the rotor lifetime limit value is exceeded on the screen as a warning.

In addition, the screen display device 28 displays, for example, the startup time economic parameter C calculated by the economic efficiency evaluation device 27 on the screen as the image representing the information S27 relating to the result of the economic efficiency evaluation.

The startup transition pattern selection device 29 includes user interfaces such as a keyboard, and is constituted to select one startup transition pattern from among the plurality of kinds of startup transition patterns. For example, when the user observes the image representing the startup time economic parameter C relating to the result of the economic efficiency evaluation, and inputs a command to perform the startup according to the startup transition pattern which is judged to be the most excellent in the economic efficiency in the economic efficiency evaluation, the startup transition pattern is selected. On the other hand, when the user inputs a command to perform the startup according to the startup transition pattern other than the startup transition pattern which is judged to be the most excellent in the economic efficiency in the economic efficiency evaluation, the startup transition pattern is selected.

The startup transition pattern selection device 29 outputs information S29 indicating that the startup transition pattern is selected to the startup transition pattern recording device 21 as an output signal. The startup transition pattern recording device 21 thereby outputs information S21b relating to the selected startup transition pattern, and the startup transition pattern selection device 29 receives the information S21b relating to the startup transition pattern. The startup transition pattern selection device 29 outputs the information S20 relating to the startup transition pattern to the steam turbine startup control apparatus 30 as an output signal.

Hereinabove, it is described the case when the selection of the startup transition pattern is performed in accordance with the manual operation of the user, but the embodiment is not limited thereto. It may be constituted such that the startup transition pattern selection device 29 automatically selects the startup transition pattern which is judged to be the most excellent in the economic efficiency in the economic efficiency evaluation based on the information S27 relating to the result of the economic efficiency evaluation. For example, it may be constituted such that the startup transition pattern selection device 29 selects the startup transition pattern whose value of the startup time economic parameter calculated by the economic efficiency evaluation device 27 is the highest to accurately perform the startup of the steam turbine 10.

As stated above, the economic efficiency evaluation device 27 performs the economic efficiency evaluation regarding the various startup transition patterns recorded in the startup transition pattern recording device 21 based on the parameters recorded in the parameter recording device 24 and the information relating to the rotor lifetime recorded in the rotor lifetime recording device 25 in the steam turbine startup support system 20 of the embodiment. The screen display device 28 displays the result of the economic efficiency evaluation performed by the economic efficiency evaluation device 27. Accordingly, in the present embodiment, it is possible for the user to easily grasp the result of the economic efficiency evaluation relating to the various startup transition patterns and to easily select the startup transition pattern which is the most excellent in the economic efficiency in the economic efficiency evaluation. Further, it is constituted such that the steam turbine startup support system 20 automatically selects the startup transition pattern which is the most excellent in the economic efficiency, and thereby, setting of the startup can be efficiently performed.

In the present embodiment, it is possible for the user to add and change the information relating to the startup transition pattern by using the startup transition pattern registration device 22 to record in the startup transition pattern recording device 21. It is thereby possible to easily perform the startup according to the startup transition pattern in accordance with an electricity selling plan.

In the present embodiment, the cumulative value of the rotor lifetime consumption amounts where the lifetime of the turbine rotor 12 is consumed resulting from the startup of the steam turbine 10 is recorded in the rotor lifetime recording device 25 as the information relating to the rotor lifetime. The image representing the information relating to the rotor lifetime is displayed on the screen display device 28. In the present embodiment, it is therefore possible for the user to easily form a plan to exchange the turbine rotor 12.

In the present embodiment, the screen display device 28 displays that the rotor lifetime limit value is exceeded (not-illustrated) as the warning when it is judged that the cumulative value of the rotor lifetime consumption amounts exceeds the rotor lifetime limit value. Accordingly, in the present embodiment, it is possible to increase safety when the steam turbine 10 is started up.

In the present embodiment, the economic efficiency evaluation device 27 performs the economic efficiency evaluation as for the startup transition pattern where the rotor lifetime is smaller than the rotor lifetime limit value when the startup of the steam turbine 10 is performed from the various startup transition patterns. It is therefore possible to easily enable speeding-up of the arithmetic process in the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A steam turbine startup support system to support startup performed according to a startup transition pattern in a steam turbine where a power generator is driven by rotating a turbine rotor by steam, the steam turbine startup support system comprising:
   a startup transition pattern recording device to record various startup transition patterns;
   a parameter input device in which there are input a unit fuel cost of fuel consumed to generate the steam, an electricity selling price of electric power which is generated by the driving of the power generator and sold, a rotor price of the turbine rotor, a fuel consumption rate of the fuel, an availability of the steam turbine, a rotor lifetime limit value of the turbine rotor, and an output target value of the electric power which is output by the driving of the power generator as parameters;
   a parameter recording device to record the parameters input to the parameter input device;
   a rotor lifetime recording device to record information relating to a rotor lifetime of the turbine rotor;
   an economic efficiency evaluation device to perform economic efficiency evaluation regarding the various startup transition patterns recorded in the startup transition pattern recording device based on the parameters recorded in the parameter recording device and the information relating to the rotor lifetime recorded in the rotor lifetime recording device; and
   a screen display device to display a result of the economic efficiency evaluation performed by the economic efficiency evaluation device.

2. The steam turbine startup support system according to claim 1, further comprising:
   a startup transition pattern selection device to select the startup transition pattern based on the result of the economic efficiency evaluation performed by the economic efficiency evaluation device,
   wherein the startup of the steam turbine is performed according to the startup transition pattern selected by the startup transition pattern selection device.

3. The steam turbine startup support system according to claim 1,
   wherein it is judged whether or not the rotor lifetime exceeds the rotor lifetime limit value when the startup of the steam turbine is performed according to each of the various startup transition patterns based on a cumulative value of the rotor lifetime consumption amounts recorded as the information relating to the rotor lifetime in the rotor lifetime recording device and the rotor lifetime limit value input to the parameter input device, and
   the screen display device displays that the rotor lifetime exceeds the rotor lifetime limit value regarding the startup transition pattern when there is the startup transition pattern where the rotor lifetime exceeds the rotor lifetime limit value as a warning.

4. The steam turbine startup support system according to claim 3,
   wherein the economic efficiency evaluation device performs the economic efficiency evaluation regarding the startup transition pattern whose rotor lifetime is smaller than the rotor lifetime limit value when the startup of the steam turbine is performed from the various startup transition patterns.

5. The steam turbine startup support system according to claim 1, further comprising:
   a startup transition pattern registration device in which there is input information relating to the startup transition pattern,
   wherein when a new startup transition pattern which is not recorded in the startup transition pattern recording device is input to the startup transition pattern registration device, the startup transition pattern registration device records the new startup transition pattern, and
   when information to change an existing startup transition pattern which is already recorded in the startup transition pattern recording device is input to the startup transition pattern registration device, the startup transition pattern recording device records the information where the existing startup transition pattern is changed.

6. The steam turbine startup support system according to claim 1, further comprising:
a startup mode selection device to select a startup mode of the steam turbine,
wherein the economic efficiency evaluation device extracts the startup transition pattern in accordance with the startup mode selected by the startup mode selection device from the various startup transition patterns recorded in the startup transition pattern recording device and performs the economic efficiency evaluation regarding the extracted startup transition pattern.

7. The steam turbine startup support system according to claim 6,
wherein the startup mode selection device selects the startup mode based on a time elapsed from a point when an operation of the steam turbine is stopped.

\* \* \* \* \*